United States Patent [19]

Fillmore

[11] 4,177,691

[45] Dec. 11, 1979

[54] MOTION TRANSMITTING REMOTE CONTROL ASSEMBLY

[75] Inventor: F. Lawrence Fillmore, Birmingham, Mich.

[73] Assignee: Teleflex Incorporated, Limerick, Pa.

[21] Appl. No.: 883,458

[22] Filed: Mar. 6, 1978

[51] Int. Cl.² ............................................. F16C 1/10
[52] U.S. Cl. .................................. 74/501 P; 74/501 R
[58] Field of Search ............... 24/211 R, 206 R; 85/7;
248/17, 18, 56; 292/156, 162, 175; 74/501 P,
501 R; 285/292

[56] References Cited

U.S. PATENT DOCUMENTS 3,572,159   3/1971   Tschanz ............................ 74/501 P Primary Examiner—Samuel Scott
Assistant Examiner—J. Anderson
Attorney, Agent, or Firm—McGlynn and Milton

[57] ABSTRACT

A motion transmitting remote control assembly including a conduit movably supporting a motion transmitting core element. A fitting is disposed about the conduit adjacent a first end for attachment of the conduit to a support structure. An elongated adjustment member having teeth disposed on opposite sides of its four-sided body is attached to the conduit adjacent the other end and extends through a passageway in a support member adapted for attachment to a support structure. A locking member is supported in a second transverse passageway extending through the support member transversely to the axis of the conduit and has oppositely facing straight teeth in the upper portion of an opening therethrough whereby the locking member may be moved between a disengaged position with the adjustment member extending through the lower portion of the opening in the locking member, which has a clearance therewith, and an engaged position where the teeth in the upper portion of the opening in the locking member engage the teeth on opposite sides of the elongated adjustment member to prevent longitudinal movement of the adjustment member relative to the support member. Additionally, the locking member has a pair of legs extending downwardly with bulbous projections thereon for engaging recesses in the support member for retaining the locking member in the engaged and disengaged positions respectively.

16 Claims, 5 Drawing Figures

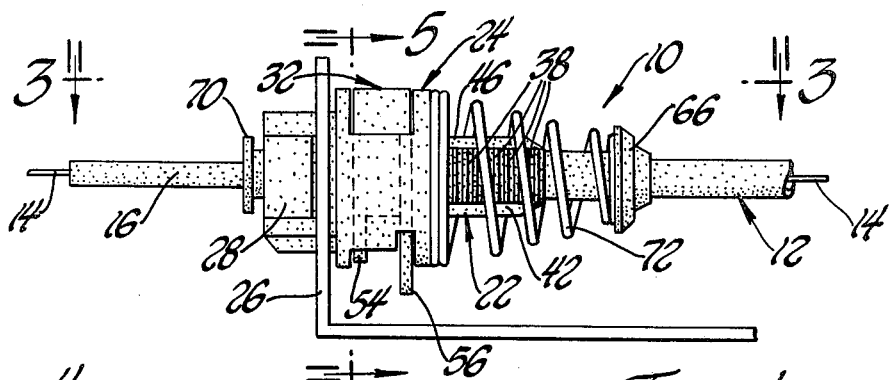
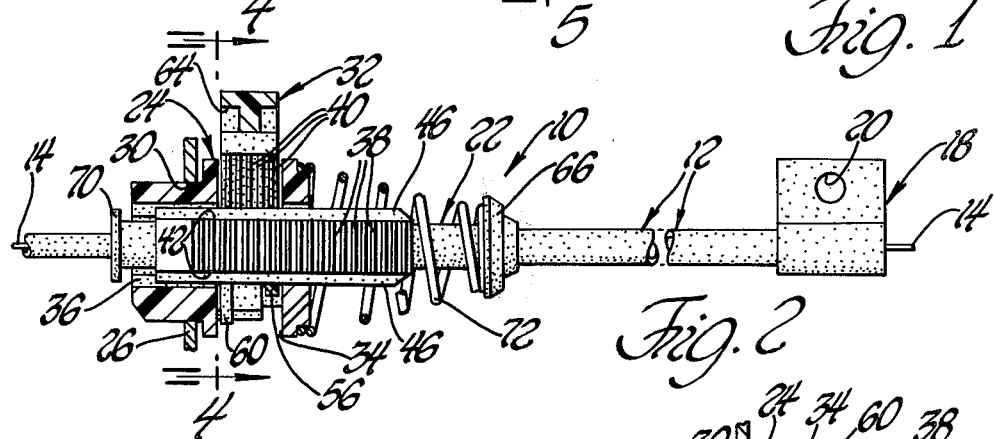
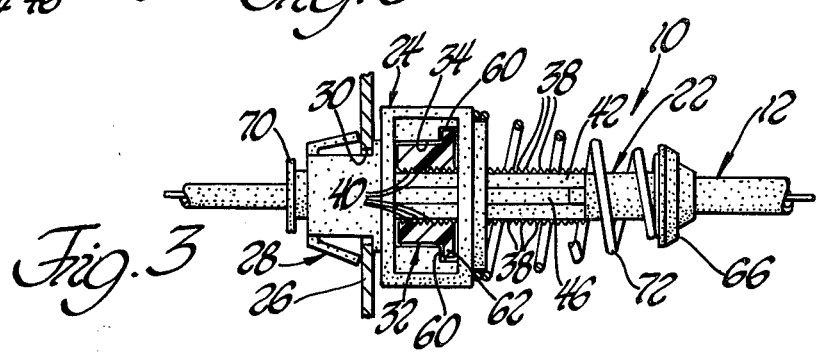
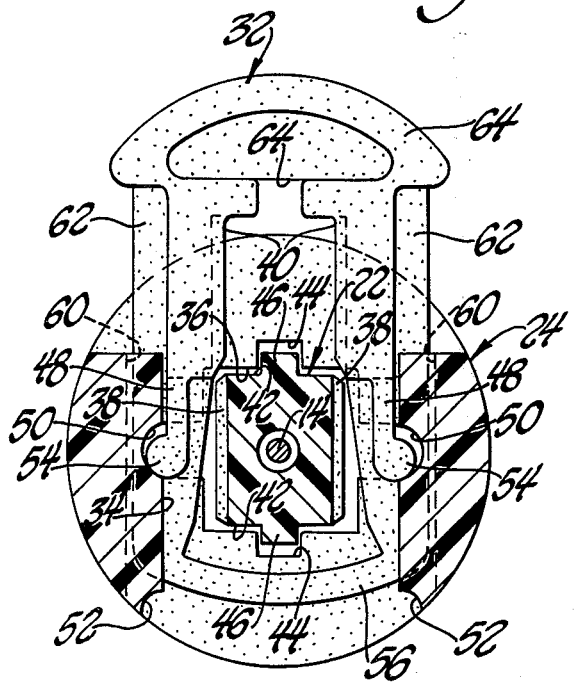
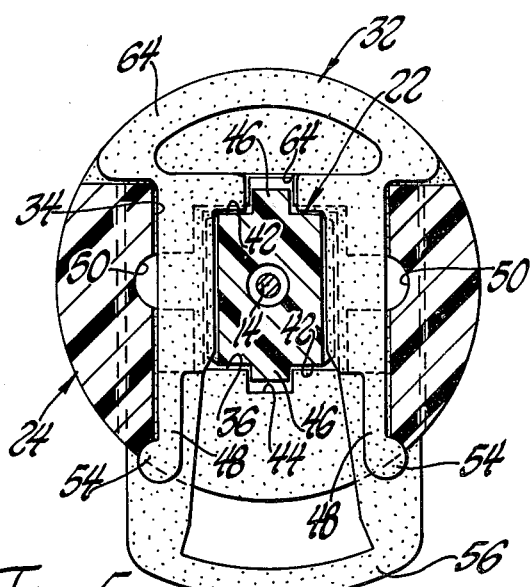

MOTION TRANSMITTING REMOTE CONTROL ASSEMBLY

The subject invention relates to a motion transmitting remote control assembly of the type wherein motion is transmitted in a curved path by a flexible motion transmitting core element movably supported by a flexible conduit.

Such remote control assemblies normally include means adjacent each end of the conduit for attaching the conduit to a support structure with the core element extending from each end of the conduit. It is frequently desirable to adjust the length of the conduit to change the position of one end of the core element extending from the conduit once the assembly is installed. An example of such a situation is wherein a remote control assembly is utilized to interconnect the accelerator pedal and a carburetor operating lever arm in an automobile. In this situation, the assembly is usually installed by attaching the conduit to the body of the automobile adjacent the accelerator pedal while attaching the end of the core element extending therefrom to the accelerator pedal. The opposite end of the conduit is attached to a support structure adjacent the carburetor so that the other or opposite end of the core element may be attached to the operating lever of the carburetor. Frequently, however, the end of the core element adjacent the carburetor does not extend from the conduit a proper amount for attachment to the operating lever of the carburetor. During such installation the accelerator pedal is in its unmoved or idle position as is the operating lever of the carburetor and if the end of the core element adjacent the operating lever of the carburetor is not positioned correctly, the operating lever of the carburetor must be moved for attachment to the core element so that the end result is that the accelerator pedal is in the idle position but the operating lever of the carburetor is not. The position of the end core element extending from the conduit, i.e., the distance the core element extends from the conduit, may be changed by altering the length of path over which the conduit extends. Assemblies for accomplishing such an adjustment are shown in U.S. Pat. Nos. 3,289,491 granted Dec. 6, 1966 in the name of Winthrop B. Conrad and 3,393,578 granted July 23, 1968 in the name of August E. Tschanz, both of which are assigned to the assignee of the subject invention. The assembly shown in these patents employ rotating threaded members which must be manually rotated to gradually change the length of the conduit. Such assemblies are excellent for small adjustments which require little time yet there was a need for an assembly for use in situations where the adjustment may be significant and must be made rapidly. A remote control assembly for accomplishing such an adjustment is shown in U.S. Pat. No. 3,572,159 granted Mar. 23, 1971 in the name of August E. Tschanz and assigned to the assignee of the subject invention. In this latter patent there is disclosed an assembly with an adjustment member disposed on the end of the conduit and extending through a passageway in a support member adapted for attachment to a support structure and with a locking member movable between locked and unlocked positions for respectively preventing relative movement between the adjustment member and the support member and allowing such relative movement. In that assembly the locking member has a circular opening with teeth or threads therein for engaging a circular adjustment member. When the locking member moves transversely of the adjustment member, large portions of the circular extent of the teeth in the circular opening in the locking member and about the adjustment member respectively become disengaged, thereby decreasing the holding power of the locking member upon the adjustment member. Further, in this assembly, the locking member is snapped into the locked position as the circular adjustment member snaps into the circular opening whereby the force required for snapping the locking member into engagement with the adjustment member is related to the retention force. Further, the adjustment member is made of plastic and during the molding process results a parting line or flash on diametrically opposite sides of the elongated adjustment member whereby, when positioned properly, such flash could resist the movement of the locking member into the locked position. Accordingly, the subject invention is an improvement over the assembly shown in U.S. Pat. No. 3,572,159 to increase the load capabilities between the locking member and the elongated adjustment member, plus other features.

It is an object and feature of this invention therefore to provide a motion transmitting remote control assembly including a conduit for movably supporting a core element with adjustment means attached to the conduit adjacent one end and extending through a support means which is adapted for attachment to a support structure with locking means movably supported by the support means for movement between engaged and disengaged positions for allowing relative movement between the adjustment means and the support means in a direction longitudinally of the conduit when in the disengaged position and for preventing such relative movement when in the engaged position, with the adjustment means having a plurality of straight irregularities disposed therealong and extending transversely to the longitudinal axis of the conduit and the locking means having a plurality of straight irregularities for coacting with the irregularities on the adjustment means when in the engaged position.

In correlation with the foregoing object and feature, it is another object and feature of this invention to provide such a remote control assembly wherein there is included a detent means between the locking means and the support means for retaining the locking means in the engaged and disengaged positions respectively.

Other advantages of the present invention will be readily appreciated as the same becomes better understood by reference to the following detailed description when considered in connection with the accompanying drawings wherein:

FIG. 1 is a side elevational view of a preferred embodiment of the subject invention showing the locking means in the engaged position;

FIG. 2 is a side elevational view partially broken away and in cross section but showing the locking means in the disengaged position;

FIG. 3 is a view taken substantially along line 3—3 with a portion of the assembly broken away and in cross section;

FIG. 4 is an enlarged cross-sectional view taken along line 4—4 of FIG. 2; and

FIG. 5 is an enlarged cross-sectional view taken substantially along line 5—5 of FIG. 1.

Referring now to the drawings where like numerals indicate like or corresponding parts throughout the several views, a motion transmitting remote control assembly constructed in accordance with the subject invention is generally shown at 10.

The motion transmitting remote control assembly includes a conduit which is generally indicated at 12. The conduit 12 is preferably of the well known type including an inner tubular member made of organic polymeric material and surrounded by a plurality of long lay wires disposed helically thereabout with a casing of organic polymeric material disposed about the long lay wires and about the inner tubular member. The conduit 12 is flexible along its length.

A motion transmitting core element 14 is movably supported by the conduit 12 with the ends thereof extending from the ends of the conduit 12. The motion transmitting core element 14 is a wire member, as illustrated, but also may comprise metal strands helically wound together in cable-like fashion. Normally, coupling members (not shown) are secured to the ends of the core element for attachment of the core element to operated or operating members. A sleeve-like umbrella may be secured over the extension 16 and the opposite end of the core element may both be in the configuration as illustrated and described in the aforementioned U.S. Pat. No. 3,572,159.

A fitting generally indicated at 18 is attached to one end of the conduit 12 and is adapted by a flange and a hole 20 therein for attaching the conduit 12 to a support structure, such as the body of a vehicle.

An adjustment means comprising the elongated member generally indicated at 22 is attached to the conduit adjacent a second end. The adjustment member 22 is preferably made of an organic polymeric or plastic material which is molded or otherwise disposed about the conduit 12 so as to be immovable relative to the conduit 12. The elongated member 22 has a hole extending therethrough for movably supporting the core element 14.

There is also included a support means comprising the support member generally indicated at 24 and which is adapted for attachment to a support structure such as the bracket 26. The support member 24 has integrally formed therewith a snap-in means generally indicated at 28 for insertion through an opening 30 in the support member 26 to retain the support means 24 attached to the support structure 26. The snap-in means 28 may be of the type forming the subject matter of U.S. Pat. No. 3,427,894 granted to August E. Tschanz on Feb. 18, 1969 and assigned to the assignee of the subject invention.

A locking means comprising the locking member generally indicated at 32 is supported by the support member 24 for movement between the engaged position shown in FIGS. 1 and 5 and the disengaged position shown in FIGS. 2 and 4. The locking member 32 is supported in a transverse passageway 34. The transverse passageway 34 extends through the support member 24 and intersects a four-sided passageway 36. The four-sided passageway 36 extends through the support member 24 and the adjustment member 22 is slidably supported in the passageway 36. The locking member 32 allows relative movement between the adjustment member 22 and the support member 24 longitudinally of the conduit 12 when in the disengaged position, as illustrated in FIGS. 2 and 4, and prevents such relative movement when in the engaged position illustrated in FIGS. 1 and 5.

The adjustment member 22 has a plurality of straight irregularities or teeth 38 disposed therealong and extending transversely to the longitudinal axis of the conduit, i.e., the longitudinal axis of the elongated member 22. The locking member 32 has a plurality of straight irregularities or teeth 40 for coacting with the teeth 38 on the adjustment member 22 when in the engaged position.

The adjustment member 22 is a rectangular or four-sided member having oppositely facing parallel sides with the teeth 38 disposed in side by side relationship along the sides. In other words, the teeth 38 are disposed parallel to one another and perpendicular to the axis of the member 22 or perpendicular to the direction of movement of the member 22 relative to the support member 24. The adjustment member 22 includes top and bottom surfaces 42 extending between the sides thereof and which surfaces 42 slidably engage the top and bottom surfaces of the rectangular passageway 36. The rectangular or four-sided configuration of the elongated member 22 and the passageway 36 define guide means for guiding the movement of the adjustment member 22 relative to the support member 24 while preventing rotation of the adjustment member 22 relative to the support member 24. Further, the passageway 36 includes a groove 44 in each of the top and bottom surfaces of the passageway 36 and the adjustment member 22 includes a rib 46 extending along each of the top and bottom surfaces 42 and disposed in the grooves 44. The upper and lower extremities or surfaces of the ribs 46 are in spaced relationship to the respective bottoms of the grooves 44. In other words, the extremities of the ribs 46 are prevented from engaging the bottoms of the grooves 44 when the top and bottom surfaces 42 of the elongated member 22 are in sliding engagement with the top and bottom surfaces of the passageway 36. When the elongated member 22 is molded, the parting line or points of flash are along the middle of the upper and lower extremities of the ribs 46 whereby any such flash will not engage the bottoms of the grooves 44 to inhibit movement of the elongated member 22 relative to the support member.

There is also included a detent means for retaining the locking member 32 in the engaged and disengaged positions respectively. The detent means includes the flexible fingers 48 extending from the locking member 32. The detent means also includes coacting means comprising the first recesses 50 and the second recesses or shoulders 52 for coacting with the fingers 48 to retain the locking member 32 in the disengaged and engaged positions respectively. Each finger 48 includes a bulbous or round projection 54 extending laterally or outwardly from one another. The projections 54 engage the first recesses 50 for retaining the locking member 32 in the disengaged position as illustrated in FIG. 4. In a similar fashion, the projections 54 engage the second recesses or shoulders 52 for retaining the locking member 32 in the engaged position illustrated in FIG. 5.

The locking member 32 includes an opening and the teeth 40 are disposed on opposite sides of the opening in the upper portion thereof. The lower portion of the opening is wider to provide a clearance with the teeth 38 on the elongated member 32 when in the disengaged position. The bottom of the opening in the locking member 32 is defined by a connecting strap 56. The connecting strap 56 is disposed adjacent one face of the locking member 32 whereas the fingers 48 are disposed adjacent the other face of the locking member 32, there being a space between the fingers 48 and the lower portion of the locking member 32. The fingers 48 extend downwardly from the bottom of the upper portion of the opening in the locking member 32, i.e., downwardly from the bottom or lower extremities of the teeth 40 in the locking member 32. The teeth 40, in the opening of the locking member 32, are tapered at their lower extremities for facilitating the engagement of the teeth 40 with the teeth 38 on the elongated member 22 as the locking member 32 is moved to the locking or engaged position illustrated in FIG. 5.

The transverse passageway 34 in the support member 24 includes a pair of guide channels 60 on the sides thereof and the locking member 32 includes flanges 62 along the opposite sides thereof and slidably disposed in the guide channels 60. The locking member 32 also includes a groove 64 extending along the top of the opening therein for receiving the rib 46 along the top surface 42 of the elongated member 22 when in the engaged position, as illustrated in FIG. 4.

The adjustment member 22, the support member 24 and the locking member 32 are all preferably made of an organic, polymeric or plastic material. The support member 24 has a circular exterior extending about the longitudinal axis of the elongated member 22 or the conduit 12. Similarly, the locking member 32 has an arcuate cap 64 which, when the locking member 32 is in the engaged position, is contiguous or even with the outer circular periphery of the support member 24 and also rests in an enlarged opening in the top of the support member 24.

The adjustment member 22 includes flanges 66 and 70 which are cooperable with the support member 24 for limiting longitudinal movement between the two members. A biasing means comprising a spring 72 is disposed between the flange 66 and the support member 24 for urging the adjustment member 22 to move relative to the support member 24 to a position where the flange 70 would engage the end of the support member 24 when the locking member 32 is in the disengaged position.

When the projections 54 are disposed in the recesses 50 to maintain the locking member 32 in the disengaged position, the teeth 40 on the locking member 32 are held out of engagement with the teeth 38 on the elongated member 22. In other words, the projections 54 being disposed in the recesses 50 define a disengaged position wherein the teeth 40 are prevented from being partially engaged with the teeth 38 whereby the elongated member 22 is free to move relative to the support member 24.

For shipping and during installation, the locking member 32 is maintained in the disengaged position shown in FIGS. 2 and 4. Once the assembly 10 is installed in its operational environment, the core element 14 is moved to one extreme of travel. If the conduit 12 is too long when the core element is moved to its extreme limit of travel, the conduit will tend to shorten thereby moving the elongated member 22 through the support member 24. When the core element is at its extreme position, the elongated member 22 will be moved to the proper position relative to the support member 24. Once in this position, the locking member 32 is moved from the disengaged position illustrated in FIG. 4 to the engaged position illustrated in FIG. 5 to maintin the length of the conduit at the proper length for the operating environment. Because the teeth 40 are straight and elongated to coact with straight and elongated teeth 38, there is a more retention between the locking member 32 and the elongated member 22. In other words, a significantly greater force is required to move the elongated member 22 relative to the locking member 32 than in prior art assemblies.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive poperty or privilege is claimed are defined as follows:

1. A motion transmitting remote control assembly comprising; a conduit, a core element movably supported by said conduit with the ends thereof extending from the ends of said conduit, a fitting adjacent a first end of said conduit for attaching said conduit to a support structure, adjustment means attached to said conduit adjacent the second end thereof, support means adapted for attachment to a support structure, locking means supported by said support means for movement between engaged and disengaged positions for allowing relative movement between said adjustment means and said support means in a direcion longitudinally of said conduit when in said disengaged position and for preventing said relative movement when in said engaged position, said adjustment means having a plurality of straight irregularities disposed therealong and extending transversely to the longitudinal axis of said conduit, said locking means having a plurality of straight irregularities of coacting with said irregularities on said adjustment means when in said engaging position, said adjustment means comprising an elongated member having oppositely facing parrallel sides, said irregularities being disposed in side by side relationship along said sides, and guide means defined by a passageway extending through said support means with said elongated member disposed therein for guiding the movement of said elongated member relative to said support means while preventing rotation of said elongated member relative to said support means.

2. An assembly as set forth in claim 1 including detent means separate from said irregularities for retaining said locking means in said engaged position.

3. An assembly as set forth in claim 1 including detent means separate from said irregularities for retaining said locking means in said disengaged position.

4. An assembly as set forth in claim 1 including detent means separate from said irregularities for retaining said locking means in said engaged and disengaged positions respectively.

5. An assembly as set forth in claim 4 where said passageway is four-sided, said adjustment means having top and bottom surfaces extending between said sides thereof and slidably engaging the top and bottom surfaces of said passageway.

6. An assembly as set forth in claim 5 wherein said passageway includes a groove in each of said top and bottom surfaces of said passageway, said adjustment means including a rib extending along each of said top and bottom surfaces thereof and disposed in said grooves.

7. An assembly as set forth in claim 6 wherein the extremities of said ribs are spaced from the respective bottoms of said grooves.

8. An assemly as set forth in claim 7 wherein said support means includes a transverse passageway extending therethrough in a direction transverse to and intersecting said four-sided passageway, said locking means being disposed in said transverse passageway for movement between said engaged and disengaged positions in a direction transverse to the longitudinal axis of said elongated member defining said adjustment means, said detent means including at least one flexible finger extending from said locking means, and coacting means on said support means for coacting with said finger to retain said locking means in said engaged and disengaged positions respectively.

9. An assembly as set forth in claim 8 wherein said finger includes a projection extending laterally and said coacting means includes a first recess in said support means for receiving said projection to retain said locking means in said disengaged position and a second recess in said support means for receiving said projection to retain said locking means in said engaged position.

10. An assembly as set forth in claim 9 wherein said irregularities comprise a plurality of teeth.

11. An assembly as set forth in claim 10 wherein said locking means includes an opening with said teeth disposed on opposite sides of the opening in the upper portion thereof with the lower portion thereof being wider to provide a clearance with said teeth on said adjustment means in said disengaged position.

12. An assembly as set forth in claim 11 wherein said teeth in said opening in said locking means are tapered at the lower ends for facilitating engagement with said teeth on said adjustment means.

13. An assembly as set forth in claim 12 wherein said detent means includes two of said fingers with one on either side of said locking means and extending downwardly from the lower extremity of said teeth in said opening of locking member.

14. An assembly as set forth in claim 13 wherein said transverse passageway in said support means includes a guide channel on each side thereof and said locking means includes a flange along each side thereof, said flanges being slidably disposed in said guide channels.

15. An assembly as set forth in claim 14 wherein said locking means includes a groove extending along the top of said opening for receiving said rib along the top surface of said adjustment means when in said engaged position.

16. An assembly as set forth in claim 15 wherein said adjustment means, said support means and said locking means are made of organic polymeric material, said support means has a circular exterior extending about the longitudinal axis of said conduit, said locking means includes an arcuate cap which is contiguous with the circular periphery of said support means when in said engaged position, said adjustment means includes flanges thereon and cooperable with said support means for limiting movement thereof relative to said support means, biasing means disposed between one of said flanges and said support means for urging said adjustment means to move relative to said support means, said support means includes a snap-in means for insertion through an opening in a support structure to retain said support means thereto.

* * * * *